US011898388B1

(12) United States Patent
Plummer et al.

(10) Patent No.: US 11,898,388 B1
(45) Date of Patent: Feb. 13, 2024

(54) WALL SUPPORT CONNECTOR ASSEMBLY

(71) Applicant: GLASSCRAFT DOOR COMPANY, Houston, TX (US)

(72) Inventors: John B. Plummer, Houston, TX (US); Joseph Denley, Houston, TX (US); Dan Sitkowski, Houston, TX (US)

(73) Assignee: GLASSCRAFT DOOR COMPANY, Houston, TX (US)

( * ) Notice: Subject to any disclaimer, the term of this patent is extended or adjusted under 35 U.S.C. 154(b) by 0 days.

(21) Appl. No.: 18/225,774

(22) Filed: Jul. 25, 2023

(51) Int. Cl.
*E05D 15/16* (2006.01)
*E05D 15/06* (2006.01)
(Continued)

(52) U.S. Cl.
CPC ......... *E05D 15/0669* (2013.01); *E05D 13/00* (2013.01); *E05D 15/0652* (2013.01);
(Continued)

(58) Field of Classification Search
CPC ..... E05D 15/00; E05D 15/1005; E05D 15/28; E05D 15/0608; E05D 15/0626; E05D 15/264; E05D 15/06; E05D 15/063; E05D 15/0643; E05D 15/0647; E05D 15/165; E05D 15/0621; E05D 15/0653; E05D 15/26; E05D 15/262; E05D 15/0669; E05D 15/0682; E05D 15/0652; E05D 13/00; E05Y 2201/224; E05Y 2201/624; E05Y 2201/684; E05Y 2201/688; E05Y 2201/64;
(Continued)

(56) References Cited

U.S. PATENT DOCUMENTS 3,425,162 A * 2/1969 Halpern .............. E05D 15/0634
16/DIG. 34
4,281,435 A * 8/1981 Winter .................... E05F 5/003
16/96 R
(Continued)

FOREIGN PATENT DOCUMENTS

CN 204212585 U * 3/2015
CN 217420874 U * 9/2022
(Continued)

OTHER PUBLICATIONS

Terno Scorrevoli S.P.A, Sliding Door Systems, Magic2 Brochure, 3 pages.

(Continued)

*Primary Examiner* — Chuck Y Mah
(74) *Attorney, Agent, or Firm* — Nolte Lackenbach Siegel

(57) ABSTRACT

A door support connector assembly includes a door rail assembly that engages the top back face of the door using a plurality of fasteners. A door rail provides a continuous track and two rail stops to inhibit the door from disengaging from the track and ultimately from the wall. A wall mount assembly includes two rail guide wheels which engage the continuous door rail track and these wheels contact the two rail stops when the door is in the open or closed positions. A plurality of fasteners affix the wall mount assembly securely to the wall. An adjustment knob is provided on the wall mount assembly to vertically adjust the two rail guide wheels concurrently against the door rail continuous track to ensure reliable performance of the rolling door.

31 Claims, 5 Drawing Sheets

(51) Int. Cl.
*E06B 3/46* (2006.01)
*E05D 13/00* (2006.01)

(52) U.S. Cl.
CPC ....... *E06B 3/4636* (2013.01); *E05Y 2201/224* (2013.01); *E05Y 2201/624* (2013.01); *E05Y 2201/684* (2013.01); *E05Y 2201/688* (2013.01)

(58) Field of Classification Search
CPC ......... E05Y 2201/708; E05Y 2201/612; E05Y 2201/614; E05Y 2900/531; E05Y 2900/532; E05Y 2900/131; E05Y 2900/132; E05Y 2900/142; E06B 3/50; E06B 3/485; E06B 9/36; E06B 3/42; E06B 3/46; E06B 3/4609; E06B 3/4636; B60J 5/06; B60J 5/062; B60J 5/047; B60J 5/12; B60J 5/04; A47H 2023/025; A47H 1/04; A47H 15/00; A47H 15/02; A47H 15/04
See application file for complete search history.

(56) References Cited

U.S. PATENT DOCUMENTS

| | | | | |
|---|---|---|---|---|
| 8,950,041 | B2 * | 2/2015 | Palsson | E05D 15/063 16/105 |
| 10,392,844 | B2 * | 8/2019 | Kreyenborg | E05D 15/063 |
| 11,002,052 | B2 | 5/2021 | Terno et al. | |
| 11,118,388 | B2 | 9/2021 | Terno | |
| 11,391,075 | B2 * | 7/2022 | Montecchio | E05D 15/0652 |
| 11,519,209 | B2 | 12/2022 | Terno | |
| 2009/0077898 | A1 * | 3/2009 | Gerichten | E05D 15/063 49/506 |
| 2014/0143980 | A1 * | 5/2014 | Chang | E05D 15/0639 16/91 |
| 2014/0173990 | A1 * | 6/2014 | Schachter | E05F 5/003 49/404 |
| 2015/0074942 | A1 * | 3/2015 | Haab | E05D 15/0634 16/102 |
| 2020/0157868 | A1 | 5/2020 | Terno | |

FOREIGN PATENT DOCUMENTS

| | | | | | |
|---|---|---|---|---|---|
| CN | 218150420 | U | * | 12/2022 | |
| CN | 218324451 | U | * | 1/2023 | |
| DE | 102010038140 | A1 | * | 4/2012 | E05D 15/0639 |
| FR | 2936005 | A1 | * | 3/2010 | E05D 15/063 |
| JP | 2021025312 | A | * | 2/2021 | |

OTHER PUBLICATIONS

Terno Scorrevoli S.P.A, Invisible Sliding System, Magic2 Frame Webpage, 8 pages.
Terno Scorrevoli S.P.A, Sliding Door Systems, Magic2 Frame Brochure, 3 pages.
Terno Scorrevoli S.P.A, The original invisible Sliding Door Systems, Magic2 Webpage, 7 pages.

* cited by examiner

WALL SUPPORT CONNECTOR ASSEMBLY

CROSS REFERENCE TO RELATED APPLICATIONS

Not applicable.

TECHNICAL FIELD

The present disclosure generally relates to an improved wall support connector assembly and, more particularly, to a wall support connector assembly including wall support assembly and a door rail assembly, such connector assembly affixed to a rolling door and a wall.

BACKGROUND

This section of this document introduces information about and/or from the art that may provide context for or be related to the subject matter described herein and/or claimed below. It provides background information to facilitate a better understanding of the various aspects of the present invention. This is a discussion of "related" art. That such art is related in no way implies that it is also "prior" art. The related art may or may not be prior art. The discussion in this section of this document is to be read in this light, and not as admissions of prior art.

One common type of door is what may be called a sliding door. Instead of opening inwardly or outwardly as a door on hinges might, a sliding door typically translates in a direction parallel to the surface of the wall in which the door opening is constructed. A track or rail is mounted to one of the door or the wall and a pair of wheels is mounted to the other. The wheels then roll along the track or rail to translate the door. It is not unusual for rollers to also be mounted in the bottom of the door to stabilize the door and/or assist in the translation of the door.

SUMMARY

In a first aspect, a wall support connector assembly for mounting a rolling door to a wall, the wall support connector assembly comprises a door rail assembly and a wall mount assembly. The door rail assembly further comprises a door rail and a pair of rail stops. The door rail is configured to be secured to the top back door face of a rolling door and including a door rail top extension defining a roller wheel track profile having a second shape. The rail stops are each located at a respective end of the door rail and affixed to the door rail. The wall mount assembly comprises a wall mounting plate, a vertical adjustment plate, a vertical adjustment rod, a vertical adjustment knob, and a pair of rail guide wheels. The wall mounting plate is configured to be affixed to a wall. The vertical adjustment plate is adjustably affixed to the wall mounting plate. The vertical adjustment rod mechanically engages the wall mounting plate, the vertical adjustment rod extending and retracting to raise and lower the vertical adjustment plate. The vertical adjustment knob is mounted to the vertical adjustment rod and is rotatable in a clockwise and in a counter-clockwise direction to extend and retract the vertical adjustment rod. The rail guide wheels are mounted to the vertical adjustment plate, each rail guide wheel defining channel on the rim thereof having a second shape complementary of the first shape of the roller wheel track profile. The anti-jump arms are attached to the vertical adjustment plate and positioned over a respective rail guide wheel.

In a second aspect, a wall support connector assembly is for mounting a rolling door to a wall. The rolling door includes a plurality of wheels mounted on the bottom edge thereof. The rolling door also defines a top back door face, a first vertical edge, and a second vertical edge.

The wall support connector assembly comprises a door rail assembly and a wall mount assembly. The door rail assembly comprises a door rail and a pair of rail stops. The door rail is configured to be secured to the top back door face of the rolling door and located between the first vertical edge to the opposing second vertical edge of the door and parallel to the top back door face of the rolling door. The door rail furthermore includes a door rail top extension defining a roller wheel track profile. Each rail stop is located at a respective end of the door rail and affixed to the door rail.

The wall mount assembly concurrently engages the door rail assembly and the wall. The wall mount assembly comprises a wall mounting plate, a vertical adjustment plate, a vertical adjustment rod, a vertical adjustment knob, a pair of rail guide wheels, and a pair of anti-jump arms. The wall mounting plate is configured to be affixed to the wall and defines a wall mounting plate front side including a plurality of bottom flanges, a first side flange, a second side flange, a top flange, and a vertical adjustment knob flange, the vertical adjustment knob flange including a threaded tapped-through hole. The vertical adjustment plate is adjustably affixed to the wall mounting plate between the top flange, the first side flange, and the left side flange. The vertical adjustment rod mechanically engages the threaded tapped-through hole of the wall mounting plate and extends and retracts to raise and lower the vertical adjustment plate. The vertical adjustment rod is mounted over the bottom flanges and between the first side flange and the second side flange of the wall mounting plate. The vertical adjustment knob is mounted to the vertical adjustment rod to be rotated clockwise or counter-clockwise direction to extend and retract the vertical adjustment rod. The vertical adjustment knob extends through the vertical adjustment knob flange of the wall mounting plate front side. The rail guide wheels are mounted to the vertical adjustment plate. Each rail guide wheel defines a substantially concave or U-shaped channel on the rim thereof, the U-shaped channel approximately matching a corresponding substantially convex or U-shaped roller wheel track profile disposed on the door rail top extension of the door rail of the door rail assembly. The anti-jump arms are attached to the vertical adjustment plate. Each anti-jump arm is positioned over a rail guide wheel to inhibit the rolling door and door rail assembly from disengaging the wall mount assembly during horizontal movement of the rolling door.

In a third aspect, a wall support connector assembly is for mounting a rolling door to a wall. The rolling door defines a left vertical edge, a right vertical edge, and a bottom edge. A plurality of wheels is mounted on the bottom edge of the door.

The wall support connector assembly comprises a door rail assembly and a wall mount assembly. The door rail assembly includes a door rail and a pair of rail stops. The door rail is metal and substantially C shaped. The door rail is secured to the top back door face of the rolling door and located between the left vertical edge of the door to the opposing right vertical edge of the rolling door and parallel to the top back door face by affixing fasteners through a plurality of holes in the door rail body. The door rail has a door rail top extension, a door rail body, and a door rail bottom extension defining the C shape of the door rail, the door rail top extension and the door rail bottom extension extending from the door rail body at approximately a 90° angle. The door rail top extension also defines a roller wheel track profile. The rail stops stop horizontal motion of the door and keep the door affixed to the wall. Each rail stop is located at a respective end of the door rail and affixed to the door rail. Each rail stop includes a vertical extension, and a first stop flange, a second stop flange, and a door rail mounting guide slide.

The wall mount assembly concurrently engages the door rail assembly and the wall. The wall mount assembly comprises a wall mounting plate, a vertical adjustment plate, a vertical adjustment rod, a vertical adjustment knob, a pair of rail guide wheels, and a pair of anti-jump arms. The wall mounting plate is affixed to the wall and defines a wall mounting plate front side and a wall mounting plate back side. The wall mounting plate front side includes a plurality of bottom flanges, a first side flange, a second side flange, a top flange, and a vertical adjustment knob flange. The vertical adjustment knob flange including a threaded tapped-through hole. The vertical adjustment plate is adjustably affixed to the wall mounting plate between the top flange, the first side flange, and the left side flange. The vertical adjustment rod mechanically engaging the threaded tapped-through hole of the wall mounting plate. The vertical adjustment rod extends and retracts to raise and lower the vertical adjustment plate and is mounted over the bottom flanges and between the first side flange and the second side flange of the wall mounting plate. The vertical adjustment knob is mounted to the vertical adjustment rod to be rotated clockwise or counter-clockwise direction to extend and retract the vertical adjustment rod. The vertical adjustment knob extends through the vertical adjustment knob flange of the wall mounting plate front side. The rail guide wheels are mounted to the vertical adjustment plate. Each rail guide wheel defines a substantially concave or U-shaped channel on the rim thereof, the U-shaped channel approximately matching a corresponding substantially convex or U-shaped roller wheel track profile disposed on the door rail top extension of the door rail of the door rail assembly. The anti-jump arms are attached to the vertical adjustment plate, each anti-jump arm positioned over a rail guide wheel to inhibit the rolling door and door rail assembly from disengaging the wall mount assembly during horizontal movement of the rolling door.

The above presents a simplified summary of the invention as claimed below in order to provide a basic understanding of some aspects of that which is claimed below. This summary is not an exhaustive overview of the claimed subject matter. It is not intended to identify key or critical elements of the claimed subject matter or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
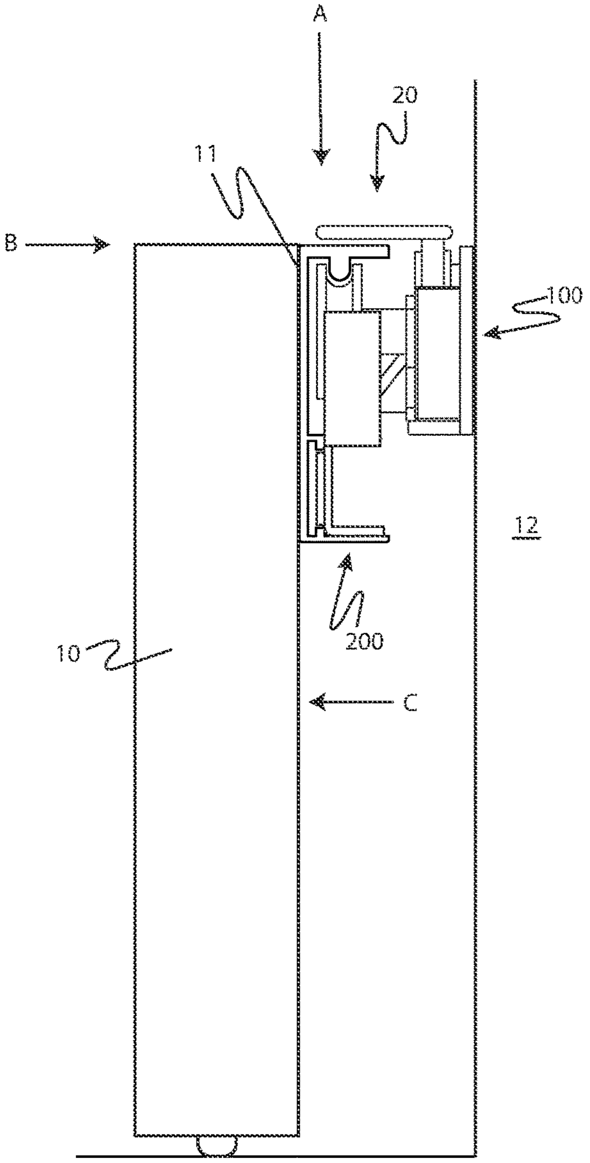
FIG. 1 depicts a rolling door, a wall and a wall support connector assembly in an assembled right edge view according to one or more embodiments.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

A need exists in the art for a wall support connector assembly that allows for reliable performance when used with a rolling door, and to hold the rolling door upright, and to secure the rolling door against the wall to which it is attached, without the need for a potentially dangerous wall-mounted rail assembly upon which a door can hang. The present embodiments meet these needs.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present disclosure relates to a wall support connector assembly for use with a door that rolls on the floor and therefore does not require a potentially dangerous wall-mounted rail system. The wall support assembly engages a door and a wall concurrently and includes a wall mount assembly and a door rail assembly.

The wall mount assembly has a wall mounting plate which is affixed on a wall using a plurality of fasteners. Adjustably mounted to the front side of the wall mounting plate is a vertical adjustment plate. Located on the front side of the wall mounting plate and behind and under the vertical adjustment plate is a vertical adjustment rod.

Located on the front side of the vertical adjustment plate are two or more rail guide wheels. These wheels have a channel on the rim of the wheel. The shape of this channel closely matches an inverse and corresponding protrusion called the roller wheel track located on the door rail top extension. That is, the channel is complementary in shape to the roller wheel track.

Located on the side edge of the wall support assembly is a vertical adjustment knob, which is slottedly attached to the vertical adjustment rod. When the knob is turned in a clockwise direction, the vertical adjustment knob extends which pushes the vertical adjustment rod, such motion causing the vertical adjustment plate to raise vertically. When the knob is turned in a counterclockwise motion, the vertical adjustment rod retracts, which causes the vertical adjustment plate to lower vertically. Thus, rotating the vertical adjustment knob reciprocates the vertical adjustment rod and the vertical adjustment between a raised position and a lowered position. This raising and lowering motion is used to position the rail guide wheels accurately and reliably into the roller wheel track to securely hold the rolling door against the wall.

Two damper triggers may be positioned on the front side of the vertical adjustment plate. The two damper triggers are aligned in the vertical z-axis and depth x-axis and are not offset from one another. These damper triggers may be used in conjunction with one or two optional soft-close dampers that may be adjustably affixed to the door rail mounting guide of the door rail. In embodiments including the optional soft-close dampers, the damper trigger contacts the soft-close damper, which provides a breaking effect to the horizontal motion of the door.

A anti-jump arm is located on the top edge of the vertical adjustment plate extending vertically over each of the guide rail wheels and over the top of the door rail top extension. One or more anti-jump arms may be used. The anti-jump arm ensures that the wall support connector assembly and the rolling door cannot become disengaged during use. If an object on the floor encounters the wheels on the rolling door and causes a disruption in the motion of the door, these anti-jump arms ensure that the door does not disengage from the wall.

A door rail assembly is affixed to the top back edge of the rolling door facing the wall and is affixed to the door using a plurality of holes in the door rail and fasteners. The door rail assembly is, in the illustrated embodiments, C-shaped, with the top arm or door rail top extension extending at approximately a 90° angle away from the back face of the rolling door. This door rail top extension extends at least as far as the bottom arm or door rail bottom extension.

Located on the bottom side of the door rail top extension is a protrusion which has a shape that is an inverse shape to the corresponding channel located on the roller wheel. That is, this protrusion is complementary in shape to the channel. This protrusion is called the roller wheel track. When in use, the roller wheel follows this roller wheel track as the rolling door moves horizontally across the floor.

Rail stops are adjustably positioned at each end of the door rail. The rail stop is affixed to the door rail in the door rail mounting guide using fasteners. The rail stops have flanges that extend at a 90° angle away from the plane of the door rail body. When in use, the rolling door movement causes the rail stop flange to contact the rail guide wheel on the wall support assembly to stop the door motion. With a rail stop located at each end of the door rail, then the rail stop will stop the rolling door motion when opening or closing the rolling door.

The embodiments differ from conventional practice at least by providing a more secure method of stopping the door while in motion and ensuring that the rolling door does not disengage from the wall, and allow for one vertical adjustment (rather than multiple adjustments which is therefore easier to install and maintain by the user), and provide an adjustment knob located on the side of the assembly which is more accessible to the user (rather than having adjustment on the top side of the assembly which is more difficult to access).

Now turning to the drawings, FIG. 1 depicts a right edge view of the wall support connector assembly 20, a rolling door 10, and a wall 12 according to one or more embodiments. The wall support connector assembly 20 is connected to the wall 12 and the rolling door 10 at the top edge 11 of the rolling door 10. The wall support connector assembly 20 engages the rolling door 10 and the wall 12 concurrently.

The wall support connector assembly 20 includes of a wall mount assembly 100 and a door rail assembly 200. The wall mount assembly 100 is illustrated in detail in FIGS. 9-12 and discussed further below in connection with those drawings. The door rail assembly 200 is illustrated in detail in FIGS. 4-5 and also discussed further below in connection with those drawings.

Figure 2:
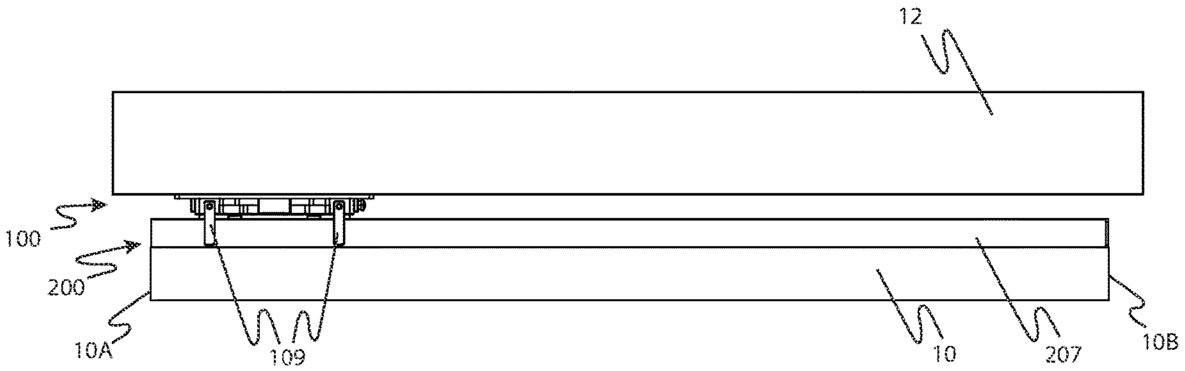
FIG. 2 depicts in an assembled top view a rolling door, a wall and a wall support connector assembly according to one or more embodiments.

FIG. 2 depicts an assembled top view from the direction indicated by the arrow A in FIG. 1 of the rolling door 10, the wall 12, and the wall support connector assembly 20. Note the door rail 206 shown extending from one edge 10*a* of the rolling door 10 to the opposing edge 10*b* of the rolling door 10. In this particular embodiment, two anti-jump arms 109 extend over the door rail top extension 207.

Figure 3:
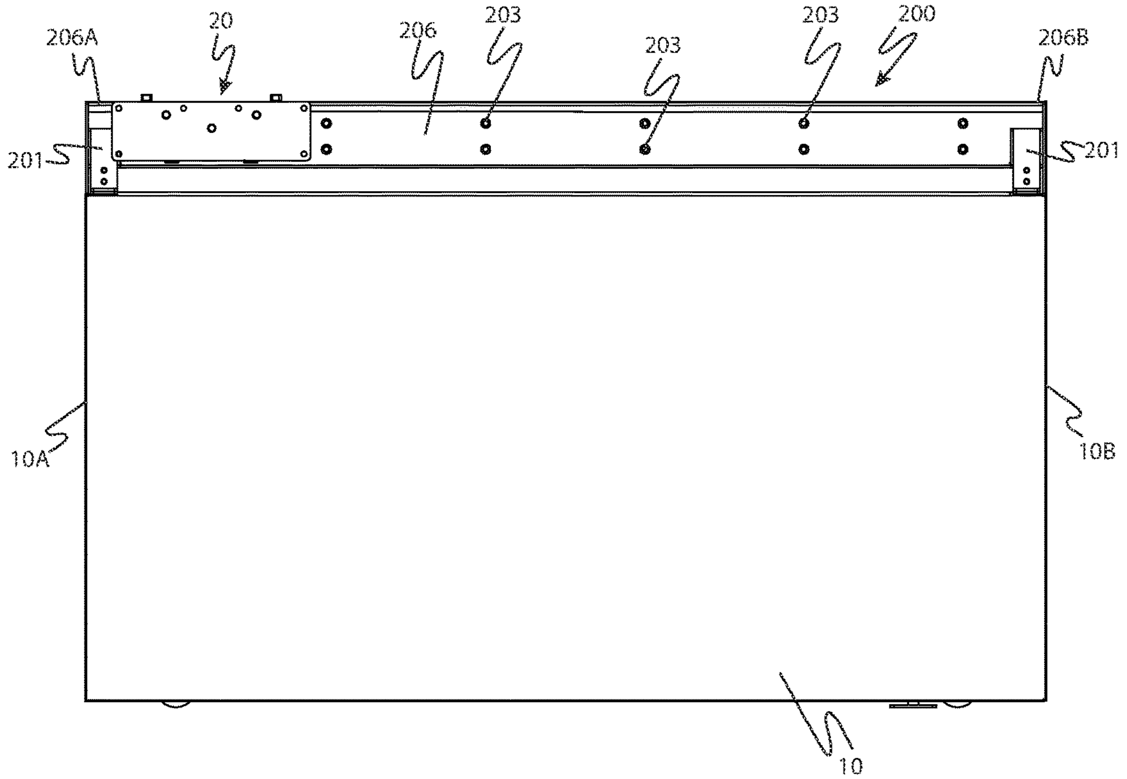
FIG. 3 depicts in an assembled, back view a rolling door and a wall support connector assembly according one or more embodiments.
Figure 8A:
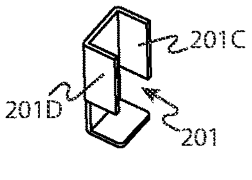
FIG. 8A is a perspective view of the rail stop.
Figure 8B:
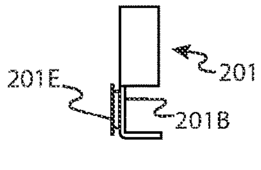
FIG. 8B is an edge view of the rail stop showing the door rail mounting guide slide.
Figure 8C:
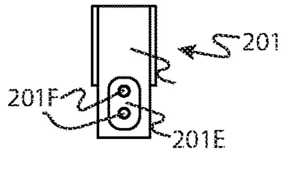
FIG. 8C is a back view of the rail stop showing the through holes.

FIG. 3 depicts back view from the direction indicated by the arrow B of the rolling door 10 and the wall support connector assembly 20. The wall support connector assembly 20 includes rail stops 201 according one or more embodiments. Additional detailed views of the rail stops 201 are shown in FIGS. 8A-8C and discussed further below.

The subject matter claimed below permits wide latitude in the implementation of the rail stops 201 and their positions relative to the door rail 206. In some embodiments, the rail stops 201 are positioned at each end 206*a*, 206*b* of the door rail 206 as shown in FIG. 3. In other embodiments not shown, the rail stops 201 are not positioned at each end 206*a*, 206*b* of the door rail 206 but are rather positioned somewhere between the two ends 206*a*, 206*b*. In some embodiments the rail stops 201 are fixed in their positions relative to the door rail 206 while in other embodiments the rail stops 201 are adjustably affixed on the door rail 206. Those skilled in the art having the benefit of this disclosure may appreciate still other variations.

A plurality of door rail mounting holes 203 are also shown, not all of which are indicated. Fasteners not shown in FIG. 3 extend through the mounting holes 203 to securely affix the door rail assembly 200 to the rolling door 10. The mounting holes 203 are positioned at different locations in the door rail 206. The presently claimed subject matter also permits latitude in the number and locations of the mounting holes 203. In some embodiments, the mounting holes 203 are vertically and/or horizontally aligned. The mounting holes 203 are, in the embodiment of FIG. 3, both vertically and horizontally aligned. However, in other embodiments not shown, the mounting holes 203 may be unaligned.

Figure 4:
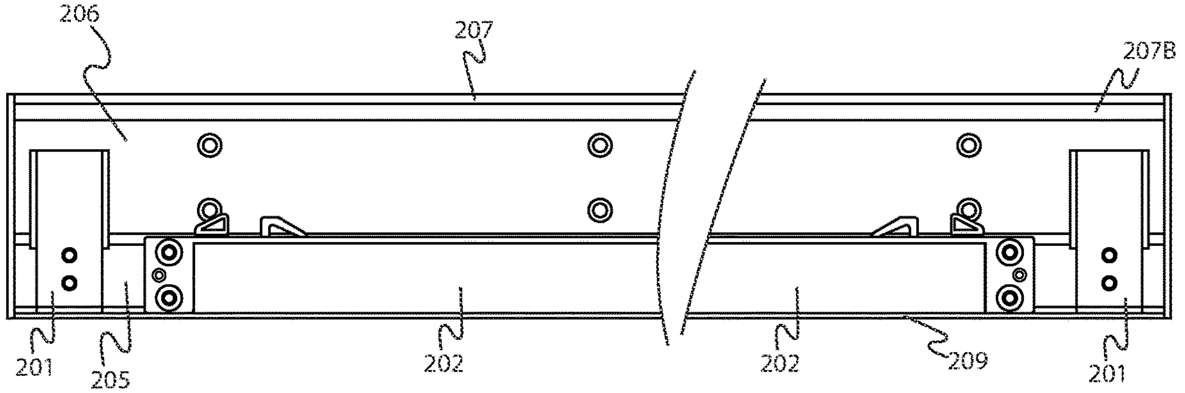
FIG. 4 depicts the door rail assembly including a plurality of mounting holes according to one or more embodiments.

FIG. 4 depicts a front view from the direction indicated by the arrow C in FIG. 1 of the door rail assembly 200. This the door rail 206 of the door rail assembly 200 comprises, as shown in FIG. 4, a door rail body 208, a door rail top extension 207, a door rail bottom extension 209, a door rail mounting guide 205, and a substantially convex or U-shaped roller wheel track profile 207B. Also shown are the rail stops 201.

Figure 5:
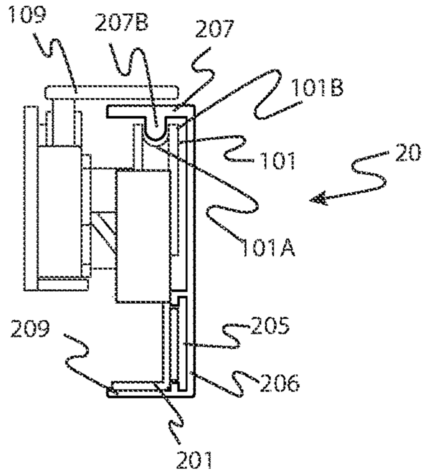
FIG. 5 depicts an edge view of the wall support connector assembly which includes the wall mount assembly and the door rail assembly.

The door rail mounting guide 205 serves as a mounting guide for the rail stops 201 and the optional soft-close dampers 202. This door rail mounting guide 205 is also shown in FIGS. 5-6. In an embodiment, the door rail assembly 200 includes one soft-close damper 202 located abutting either one of the rail stops 201. The soft-close damper 202 provides a breaking action when opening or closing the door, depending upon the installed position of the soft-close damper 202. In an embodiment, the door rail assembly 200 includes two soft-close dampers 202, each abutting one of the two rail stops 201.

FIG. 5 is an edge view of the wall support connector assembly 20. The rail guide wheel 101 includes a substantially concave or U-shaped channel 101*a* on the rim 101*b* of the rail guide wheel 101. Also shown is the roller wheel track profile 207B located on the bottom side of the door rail top extension 207. Note how this profile closely inversely matches the U-shaped channel in the rail guide wheel 101 as mentioned above. During the horizontal movement of the rolling door 10, the rail guide wheel 101 follows the roller wheel track profile 207B to ensure easy and reliable movement of the rolling door 10.

Also depicted is the anti-jump arm 109 showing its location over the top of the door rail top extension 207, the anti-jump arm 109 ensuring that the rolling door 10 does not disengage from the wall 12. The rail stop 201 is shown mounted in the door rail mounting guide 205, which is a part of the door rail 206. The rail stop 201 is supported by the door rail bottom extension 209.

Figure 6B:
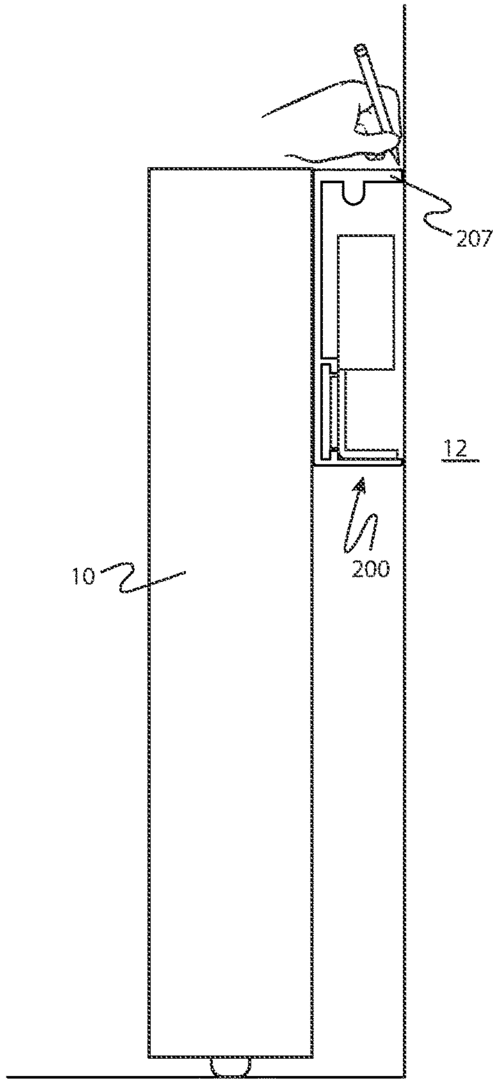
FIG. 6B shows the installation right edge view.
Figure 6A:
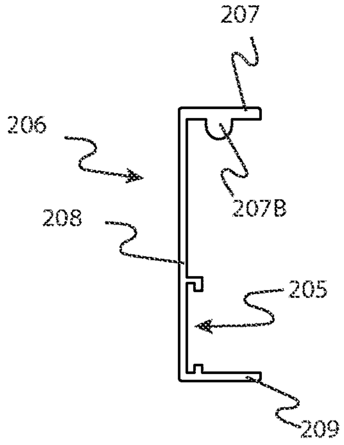
FIG. 6A depicts an edge view of the door rail.

FIG. 6A depicts an edge view of the door rail 206, which includes the door rail top extension 207, the roller wheel profile 207B, the door rail body 208, the door rail bottom extension 209 and the door rail mounting guide 205. The width of the door rail top extension 207 is the same or wider than the width door rail bottom extension. In an embodiment, the width of the door rail top extension 207 is 15 mm and the width of the door rail bottom extension 209 is also 15 mm. In another embodiment, the width of the door rail top extension 207 is 16 mm and the width of the door rail bottom extension 209 is 14 mm.

FIG. 6B shows the installation right edge view. During installation of the rolling door 10 and the wall support connector assembly 20 to the wall, the door rail assembly 200 is affixed to the rolling door 10. The rolling door 10 with the door rail assembly 200 is positioned immediately against the wall 12, and a line is made on the wall 12 at the point where the door rail top extension 207 meets the wall 12. This wall mount assembly will be installed with this line as the top edge of the wall mounting plate 102.

Figure 7:
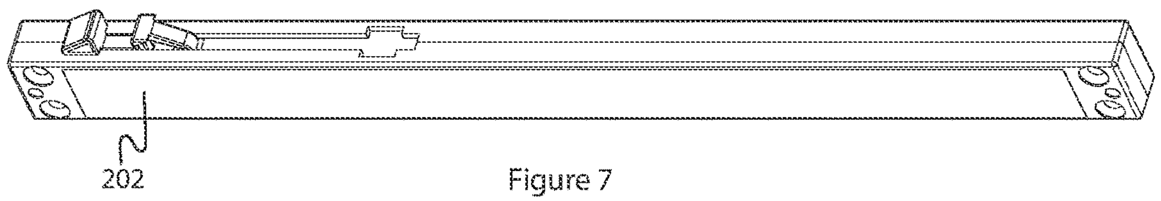
FIG. 7 is a perspective view of an optional soft-close damper. front view of a plurality of dual support connectors mounted to a door panel.

FIG. 7 shows a perspective of the optional soft-close damper 202. Such soft-close dampeners are known to the art. Any suitable soft-close dampener known to the art may be used in embodiments the employ them.

Figure 12:
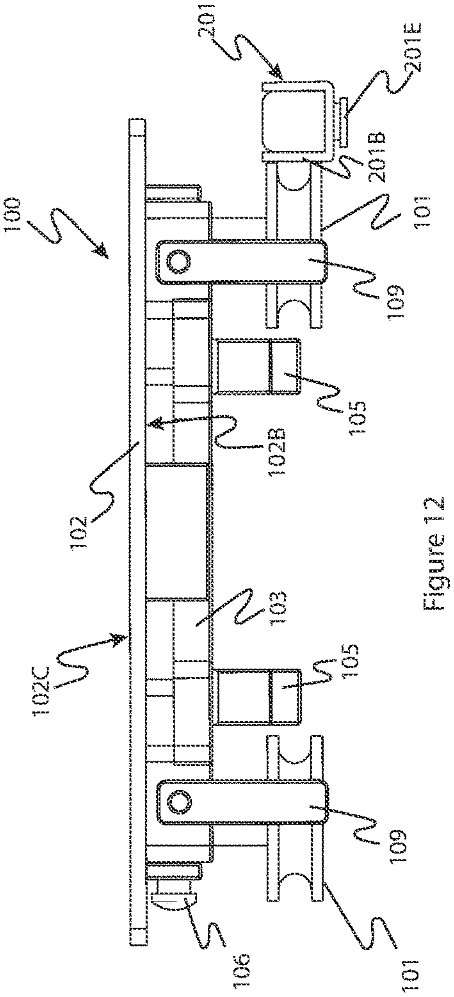
FIG. 12 is a top view of the wall mount assembly showing the location of the anti-jump arms.

FIG. 8A is a perspective view of the rail stop 201 and shows the right stop flange 201C and the left stop flange 201D. The same rail stop 201 is used on the right end 206*b* and the left end 206*a* of the door rail assembly 200, and therefore both a right and left flange 201C, 201D are used on each rail stop 201. The rail stop 201 is also depicted in FIGS. 8B, 8C, and 12. FIG. 8B shows an edge view of the rail stop 201 and the door rail mounting guide slide 201E and the vertical extension 201B. FIG. 8C shows the back view of the rail stop 201, and the through holes 201F through which fasteners (not shown in FIG. 8C) are used to attach and secure the rail stop 201 to the door rail 206 in the door rail mounting guide 205.

Figure 9:
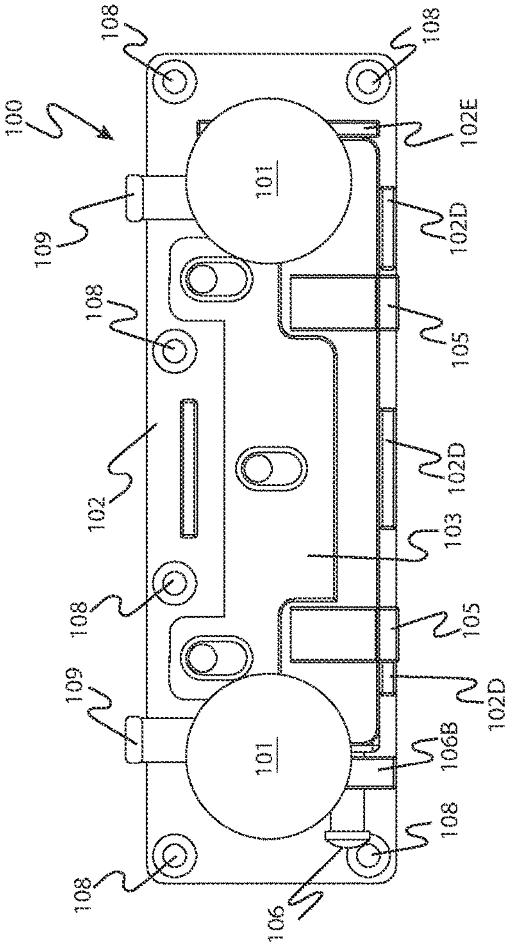
FIG. 9 is a front, assembled view of the wall mount assembly.

FIG. 9 shows a front, assembled view from the direction indicated by the arrow C in FIG. 1 of the wall mount assembly 100. Included in this wall mount assembly 100 is the wall mounting plate 102 which is affixed to the wall 12 using fasteners (not shown in FIG. 9) which pass through a plurality of wall mount through holes 108. The wall mounting plate 102 back side 102C is in contact with the wall 12. Additional detailed views of the wall mount assembly 100 are included in FIGS. 10-12.

The wall mounting plate 102 includes a plurality of flanges extending at substantially 90° angles away from the wall mounting plate 102 front side 102B. These flanges include the right side flange 102E, left side flange 102F, bottom flanges 102D, and top flange 102G. These flanges surround the vertical adjustment plate 103 and the vertical adjustment rod 104 as shown.

On the left side of the door rail assembly 100 is the vertical adjustment knob 106. This knob passes through the tapped-through hole 106C in the vertical adjustment knob flange 106B. One end of the vertical adjustment knob 106 is positioned in a slot at the end of the vertical adjustment rod 104.

The vertical adjustment plate 103 is positioned in front of the wall mounting plate front side 102B and between the top flange, right side flange, and left side flange. On the front side of the vertical adjustment plate 103 are two rail guide wheels 101. On the lower front of the vertical adjustment plate 103 are two optional damper triggers 105. These damper triggers 105 connect with the soft-close damper 202 when the rolling door 10 is in motion in order to supply a breaking effect to the motion of the rolling door and to slow the movement down as the rolling door 10 approaches the rail stop 201. In an embodiment, the vertical adjustment plate 103 includes one damper trigger 105. In another embodiment, the vertical adjustment plate 103 does not include a damper trigger 105.

Figure 10:
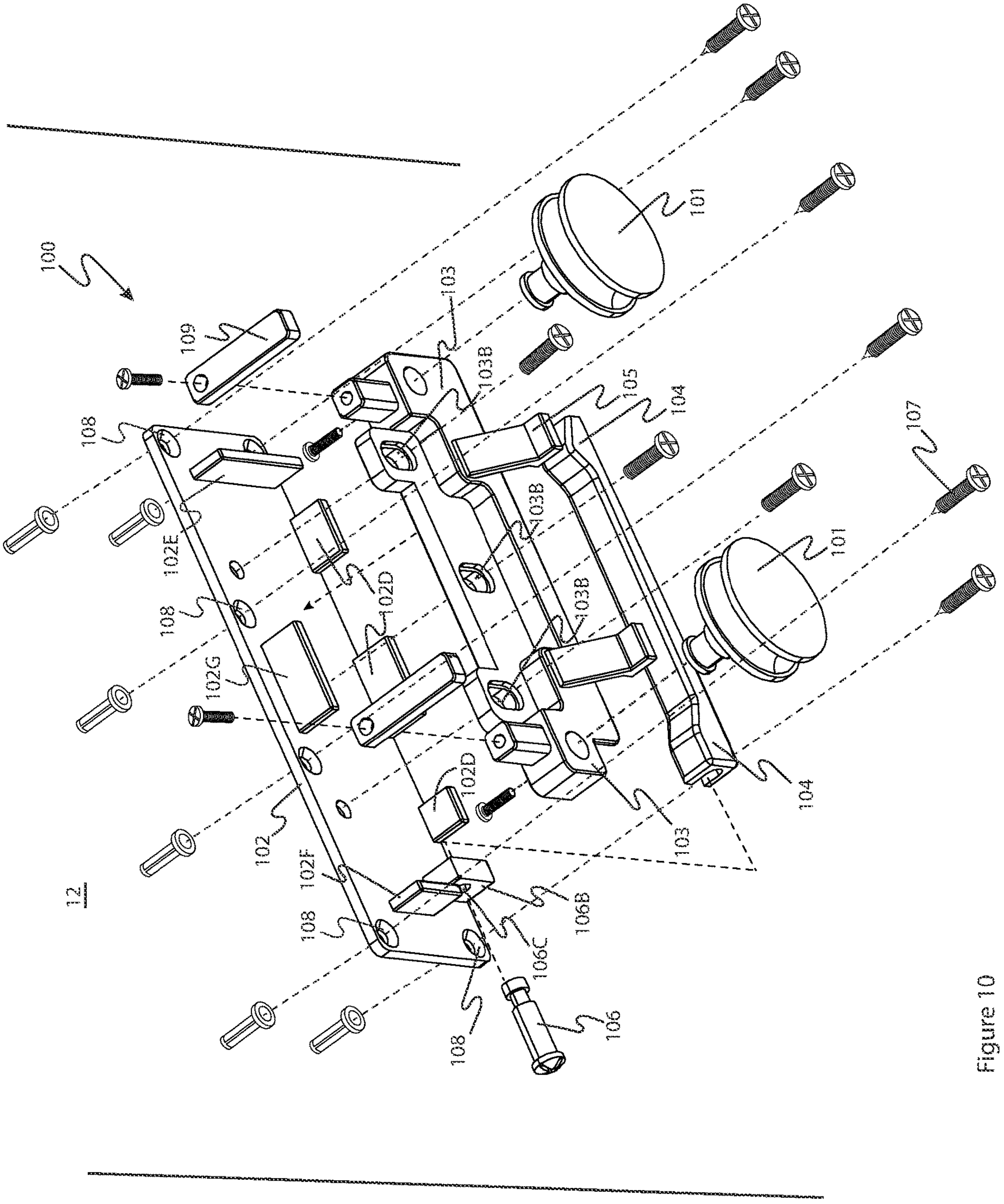
FIG. 10 is an exploded perspective view of the wall mount assembly, including a plurality of mounting holes.

FIG. 10 is an exploded perspective view of the wall mount assembly 100. A plurality of fasteners 107 are shown which pass through the wall mount pass through holes 108 and attach the wall mounting plate 102 to the wall 12.

Figure 11:
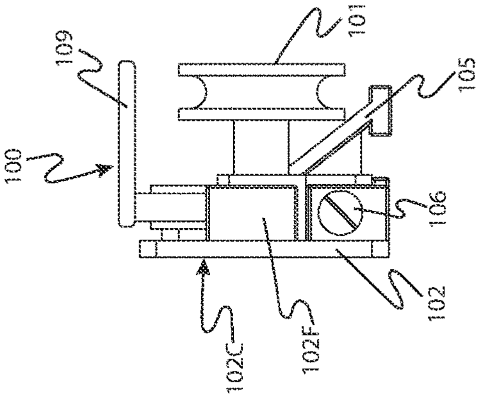
FIG. 11 is a left edge view of the wall mount assembly depicting the vertical adjustment knob.

FIG. 11 shows a left edge view of the wall mount assembly 100. The damper trigger 105 is shown extending from the vertical adjustment plate 103. The rail guide wheel 101, the wall mounting plate 102 back side 102C, the wall mounting plate 102, the left side flange, and the end of the vertical adjustment knob 106 are all shown.

The anti-jump arm 109 is shown over the rail guide wheel 101. The door rail top extension 207 is positioned between the rail guide wheel 101 and the anti-jump arm 109 when in use. The anti-jump arm 109 inhibits the rolling door 10 and door rail assembly 200 from disengaging the wall 12 and the wall mount assembly 100.

The vertical adjustment plate 103 and all its attachments, including the rail guide wheel 101, the damper trigger 105, and the anti-jump arms 109 all can be adjusted together in a up or down vertical motion to ensure correct and reliable positioning when using the rolling door 10. This adjustment occurs when the vertical adjustment knob 106 is rotated in a clockwise (which causes the vertical adjustment plate 103 to move upward) or counterclockwise direction (which causes the vertical adjustment plate 103 to move downwards). In an embodiment, the vertical adjustment plate 103 can be adjusted upwards by up to 12 mm. In another embodiment, the vertical adjustment plate 103 can be adjusted downwards by up to 8 mm.

FIG. 12 shows a wall mount assembly 100 and rail stop 201 in a top view. In this view, the rail stop 201 is contacting the rail guide wheel 101, which will inhibit the rolling door 10 from further movement, and keep the rolling door 10 positioned against the wall 12.

The present disclosure contemplates some variation in the materials of construction. In embodiments, the wall support connector assembly can be made using metal parts, including aluminum or zinc or other metal alloys. In embodiments, the wall support connector assembly can be made using polymer parts, such as acrylic, or polycarbonate, or polyvinyl chloride, or acrylonitrile-butadiene-styrene, or other polymer types.

The present disclosure also contemplates some variation in shape and dimension. In embodiments, wall mount assembly can have a shape for the wall mounting plate that is a rectangle, a rectangle with rounded edges, a half round, or a decorative molding shape. In embodiments, the door rail assembly can include a roller wheel track profile that does not closely match the shape of the roller wheel as is shown herein.

Note that not all embodiments will necessarily manifest all the improvements, benefits, and features described above. Furthermore, to the extent that various embodiments manifest one or more of these improvements and/or benefits, they will not necessarily possess them to the same degree. Those skilled in the art having the benefit of this disclosure may appreciate still other improvements beyond those presented herein.

Throughout this disclosure various directional terms are employed to describe various aspects of the wall support connector assembly 20 and its operations. These may include, for example, "up", "down", "raise", "lower", "vertical", "lateral", and others. These directional terms are defined relative to the force of the Earth's gravity. Thus, terms such as "up" and "raise" are coincident with and opposed to the force of gravity whereas terms such as "down" and "lower" are coincident with and in conjunction with the force of gravity.

The terms "substantially", "approximately", "about", and other similar terms as used herein indicates that some variation from the modified quantity or characteristic may be tolerated so long as such variation does not impair the desired functionality of the quantity or characteristic under discussion. For example, in the phrase "substantially 90° angles" or "approximately 90° angle", the terms "substantially" and "approximately" means that angles greater than or less than 90° may be suitable in a given embodiment provided that those angles do not impair the ascribed functionality of the angled part. Similarly, in the phrase "substantially C-shaped", the term "substantially" means that the part so described does not necessarily have to be precisely C-shaped in all embodiments so long as the part still performs the function ascribed to it herein.

The nonlimiting examples discussed are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar within the scope of this disclosure.

Accordingly, in a first embodiment, a wall support connector assembly is for mounting a rolling door to a wall, the wall support connector assembly comprises a door rail assembly and a wall mount assembly. The door rail assembly further comprises a door rail and a pair of rail stops. The door rail is configured to be secured to the top back door face of a rolling door and including a door rail top extension defining a roller wheel track profile having a second shape. The rail stops are each located at a respective end of the door rail and affixed to the door rail. The wall mount assembly comprises a wall mounting plate, a vertical adjustment plate, a vertical adjustment rod, a vertical adjustment knob, and a pair of rail guide wheels. The wall mounting plate is configured to be affixed to a wall. The vertical adjustment plate is adjustably affixed to the wall mounting plate. The vertical adjustment rod mechanically engages the wall mounting plate, the vertical adjustment rod extending and retracting to raise and lower the vertical adjustment plate. The vertical adjustment knob is mounted to the vertical adjustment rod and is rotatable in a clockwise and in a counter-clockwise direction to extend and retract the vertical adjustment rod. The rail guide wheels are mounted to the vertical adjustment plate, each rail guide wheel defining channel on the rim thereof having a second shape complementary of the first shape of the roller wheel track profile. The anti-jump arms are attached to the vertical adjustment plate and positioned over a respective rail guide wheel.

In a second embodiment, in the wall support connector assembly of the first embodiment, the door rail is configured to be secured to the top back door face of the rolling door by including a plurality of holes in a plate thereof through which fasteners may engage the top back door face.

In a third embodiment in the wall support connector assembly of the first embodiment, the wall mounting plate is configured to be affixed to the wall by including a plurality of holes through which fasteners may engage the wall.

In a fourth embodiment, in the wall support connector assembly of the first embodiment, the respective horizontal position of each of the rail stops along the door rail body is adjustable to define the position to which the rolling door opens or closes.

In a fifth embodiment, in the wall support connector assembly of the first embodiment, the rail stops directly contact the rail guide wheel of the wall mount assembly to stop horizontal motion of the rolling door.

In a sixth embodiment, in the wall support connector assembly of the first embodiment: the first shape of the roller wheel track profile is substantially convex or U-shaped; and the second shape of the channel is substantially concave or U-shaped.

In a seventh embodiment, in the wall support connector assembly of the first embodiment, the respective horizontal position of each of the rail stops along the door rail body is adjustable to define the position to which a rolling door opens or closes.

In an eighth embodiment, the wall support connector assembly of the first embodiment further includes a pair of soft-close dampers, one on either end of the door rail assembly and abutting one of the two rail stops, each of the soft-close dampers being affixed to the door rail assembly at the door rail mounting guide slide to provide a breaking affect to the horizontal motion of the rolling door.

In a ninth embodiment, the wall support connector assembly of the eighth embodiment further comprises a pair of damper triggers affixed to a front side of the vertical adjustment plate to engage at least one of the soft-close dampers, the damper triggers in alignment in both vertical x-axis and depth y-axis and not offset.

In a tenth embodiment, in the wall support connector assembly of the first embodiment, the vertical adjustment rod extends and retracts to raise or lower the vertical adjustment plate by as much as 10 mm.

In an eleventh embodiment, a wall support connector assembly is for mounting a rolling door to a wall. The rolling door includes a plurality of wheels mounted on the bottom edge thereof. The rolling door also defines a top back door face, a first vertical edge, and a second vertical edge.

The wall support connector assembly comprises a door rail assembly and a wall mount assembly. The door rail assembly comprises a door rail and a pair of rail stops. The door rail is configured to be secured to the top back door face of the rolling door and located between the first vertical edge to the opposing second vertical edge of the door and parallel to the top back door face of the rolling door. The door rail furthermore includes a door rail top extension defining a roller wheel track profile. Each rail stop is located at a respective end of the door rail and affixed to the door rail.

The wall mount assembly concurrently engages the door rail assembly and the wall. The wall mount assembly comprises a wall mounting plate, a vertical adjustment plate, a vertical adjustment rod, a vertical adjustment knob, a pair of rail guide wheels, and a pair of anti-jump arms. The wall mounting plate is configured to be affixed to the wall and defines a wall mounting plate front side including a plurality of bottom flanges, a first side flange, a second side flange, a top flange, and a vertical adjustment knob flange, the vertical adjustment knob flange including a threaded tapped-through hole. The vertical adjustment plate is adjustably affixed to the wall mounting plate between the top flange, the first side flange, and the left side flange. The vertical adjustment rod mechanically engages the threaded tapped-through hole of the wall mounting plate and extends and retracts to raise and lower the vertical adjustment plate. The vertical adjustment rod is mounted over the bottom flanges and between the first side flange and the second side flange of the wall mounting plate. The vertical adjustment knob is mounted to the vertical adjustment rod to be rotated clockwise or counter-clockwise direction to extend and retract the vertical adjustment rod. The vertical adjustment knob extends through the vertical adjustment knob flange of the wall mounting plate front side. The rail guide wheels are mounted to the vertical adjustment plate. Each rail guide wheel defines a substantially concave or U-shaped channel on the rim thereof, the U-shaped channel approximately matching a corresponding substantially convex or U-shaped roller wheel track profile disposed on the door rail top extension of the door rail of the door rail assembly. The anti-jump arms are attached to the vertical adjustment plate. Each anti-jump arm is positioned over a rail guide wheel to inhibit the rolling door and door rail assembly from disengaging the wall mount assembly during horizontal movement of the rolling door.

In a twelfth embodiment, the wall support connector assembly of claim 11, wherein the door rail is configured to be secured to the top back door face of the rolling door by including a plurality of holes in a plate thereof through which fasteners may engage the top back door face.

In a thirteenth embodiment, in the wall support connector assembly of the eleventh embodiment, the wall mounting plate is configured to be affixed to the wall by including a plurality of holes through which fasteners may engage the wall.

In a fourteenth embodiment, in the wall support connector assembly of the eleventh embodiment: the door rail includes a door rail body, the door rail top extension, and a door rail bottom extension, and the door rail top extension and the door rail bottom extension extending at approximately a 90° angle from the door rail body.

In a fifteenth embodiment, in the wall support connector assembly of the eleventh embodiment, the pair of rail stops: define the horizontal range of motion for the rolling door; define the location to which the rolling door opens or closes; and prevents the rolling door from rolling of the wall mount assembly when the rolling door is in use.

In a sixteenth embodiment, in the wall support connector assembly of the eleventh embodiment, the respective horizontal position of each of the rail stops along the door rail body is adjustable to define the position to which the rolling door opens or closes.

In a seventeenth embodiment, in the wall support connector assembly of the eleventh embodiment, each rail stop includes a Vertical Extension, a first stop flange, a second stop flange, and a door rail mounting guide slide.

In an eighteenth embodiment, in the wall support connector assembly of the eleventh embodiment, the rail stops directly contact the rail guide wheel of the wall mount assembly to stop horizontal motion of the rolling door.

In a nineteenth embodiment, in the wall support connector assembly of the eleventh embodiment: the door rail includes a door rail top extension, a door rail body, and a door rail bottom extension; and the door rail top extension, door rail body, and door rail bottom extension define a substantially C-shape for the door rail.

In a twentieth embodiment, in the wall support connector assembly of the eleventh embodiment, the door rail assembly, the wall mount assembly, or both are constructed of a metal, a metal alloy, a polymer, or some combination therof.

In a twenty-first embodiment, in the wall support connector assembly of the eleventh embodiment, the rail stops prevent the rolling door from rolling off the wall mount assembly when the rolling door is in use.

In a twenty-second embodiment, in the wall support connector assembly of the eleventh embodiment, the respective horizontal position of each of the rail stops along the door rail body is adjustable to define the position to which the rolling door opens or closes.

In a twenty-third embodiment, the wall support connector assembly of the eleventh embodiment further includes a pair of soft-close dampers, one on either end of the door rail assembly and abutting one of the two rail stops, each of the soft-close dampers affixed to the door rail assembly at the door rail mounting guide slide to provide a breaking affect to the horizontal motion of the rolling door.

In a twenty-fourth embodiment, the wall support connector assembly of the eleventh embodiment further comprises a pair of damper triggers affixed to a front side of the vertical adjustment plate to engage at least one of the soft-close dampers, the damper triggers in alignment in both vertical x-axis and depth y-axis and not offset.

In a twenty-fifth embodiment, the wall support connector assembly of the eleventh embodiment, wherein the vertical adjustment rod extends and retracts to raise or lower the vertical adjustment plate by as much as 10 mm.

In a twenty-sixth embodiment, a wall support connector assembly is for mounting a rolling door to a wall. The rolling door defines a left vertical edge, a right vertical edge, and a bottom edge. A plurality of wheels is mounted on the bottom edge of the door.

The wall support connector assembly comprises a door rail assembly and a wall mount assembly. The door rail assembly includes a door rail and a pair of rail stops. The door rail is metal and substantially C shaped. The door rail is secured to the top back door face of the rolling door and located between the left vertical edge of the door to the opposing right vertical edge of the rolling door and parallel to the top back door face by affixing fasteners through a plurality of holes in the door rail body. The door rail has a door rail top extension, a door rail body, and a door rail bottom extension defining the C shape of the door rail, the door rail top extension and the door rail bottom extension extending from the door rail body at approximately a 90° angle. The door rail top extension also defines a roller wheel track profile. The rail stops stop horizontal motion of the door and keep the door affixed to the wall. Each rail stop is located at a respective end of the door rail and affixed to the door rail. Each rail stop includes a vertical extension, and a first stop flange, a second stop flange, and a door rail mounting guide slide.

The wall mount assembly concurrently engages the door rail assembly and the wall. The wall mount assembly comprises a wall mounting plate, a vertical adjustment plate, a vertical adjustment rod, a vertical adjustment knob, a pair of rail guide wheels, and a pair of anti-jump arms. The wall mounting plate is affixed to the wall and defines a wall mounting plate front side and a wall mounting plate back side. The wall mounting plate front side includes a plurality of bottom flanges, a first side flange, a second side flange, a top flange, and a vertical adjustment knob flange. The vertical adjustment knob flange including a threaded tapped-through hole. The vertical adjustment plate is adjustably affixed to the wall mounting plate between the top flange, the first side flange, and the left side flange. The vertical adjustment rod mechanically engaging the threaded tapped-through hole of the wall mounting plate. The vertical adjustment rod extends and retracts to raise and lower the vertical adjustment plate and is mounted over the bottom flanges and between the first side flange and the second side flange of the wall mounting plate. The vertical adjustment knob is mounted to the vertical adjustment rod to be rotated clockwise or counter-clockwise direction to extend and retract the vertical adjustment rod. The vertical adjustment knob extends through the vertical adjustment knob flange of the wall mounting plate front side. The rail guide wheels are mounted to the vertical adjustment plate. Each rail guide wheel defines a substantially concave or U-shaped channel on the rim thereof, the U-shaped channel approximately matching a corresponding substantially convex or U-shaped roller wheel track profile disposed on the door rail top extension of the door rail of the door rail assembly. The anti-jump arms are attached to the vertical adjustment plate, each anti-jump arm positioned over a rail guide wheel to inhibit the rolling door and door rail assembly from disengaging the wall mount assembly during horizontal movement of the rolling door.

In a twenty-seventh embodiment, in the wall support connector assembly of the twenty-sixth embodiment, the rail stops prevent the rolling door from rolling off the wall mount assembly when the rolling door is in use.

In a twenty-eighth embodiment, in the wall support connector assembly of the twenty-sixth embodiment, the respective horizontal position of each of the rail stops along the door rail body is adjustable to define the position to which the rolling door opens or closes.

In a twenty-ninth embodiment, the wall support connector assembly of the twenty-sixth embodiment further includes a pair of soft-close dampers, one on either end of the door rail assembly and abutting one of the two rail stops, each of the soft-close dampers affixed to the door rail assembly at the door rail mounting guide slide to provide a breaking affect to the horizontal motion of the rolling door.

In a thirtieth embodiment, the wall support connector assembly of the twenty-ninth embodiment further comprises a pair of damper triggers affixed to a front side of the vertical adjustment plate to engage at least one of the soft-close dampers, the damper triggers in alignment in both vertical x-axis and depth y-axis and not offset from one another.

In a thirty-first embodiment, the wall support connector assembly of claim 26, wherein the vertical adjustment rod extends and retracts to raise or lower the vertical adjustment plate by as much as 10 mm.

In a thirty-second embodiment, a wall support connector assembly is substantially as shown and described.

In a thirty-third embodiment, a method for mounting a rolling door to a wall is substantially as shown and described.

In a thirty-fourth embodiment, an apparatus for mounting a rolling door to a wall is substantially as shown and described.

In a thirty-fifth embodiment, the rolling door mounted to a wall substantially as shown and described.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A wall support connector assembly for mounting a rolling door to a wall, the wall support connector assembly comprising:
- a door rail assembly comprising:
  - a door rail configured to be secured to the top back door face of a rolling door and including a door rail top extension defining a roller wheel track profile having a first shape; and
  - a pair of rail stops each rail stop located at a respective end of the door rail and affixed to the door rail; and
- a wall mount assembly comprising:
  - a wall mounting plate configured to be affixed to a wall;
  - a vertical adjustment plate adjustably affixed to the wall mounting plate;
  - a vertical adjustment rod mechanically engaging the wall mounting plate, the vertical adjustment rod extending and retracting to raise and lower the vertical adjustment plate;
  - a vertical adjustment knob mounted to the vertical adjustment rod and rotatable in a clockwise and in a counter-clockwise direction to extend and retract the vertical adjustment rod;
  - a pair of rail guide wheels mounted to the vertical adjustment plate, each rail guide wheel defining channel on the rim thereof having a second shape complementary of the first shape of the roller wheel track profile; and a pair of anti-jump arms attached to the vertical adjustment plate and positioned over a respective rail guide wheel.

2. The wall support connector assembly of claim 1, wherein the door rail is configured to be secured to the top back door face of the rolling door by including a plurality of holes in a plate thereof through which fasteners may engage the top back door face.

3. The wall support connector assembly of claim 1, wherein the wall mounting plate is configured to be affixed to the wall by including a plurality of holes through which fasteners may engage the wall.

4. The wall support connector assembly of claim 1, wherein the respective horizontal position of each of the rail stops along the door rail is adjustable to define the position to which the rolling door opens or closes.

5. The wall support connector assembly of claim 1, wherein the rail stops directly contact the rail guide wheel of the wall mount assembly to stop horizontal motion of the rolling door.

6. The wall support connector assembly of claim 5, wherein the respective horizontal position of each of the rail stops along the door rail is adjustable to define the position to which the rolling door opens or closes.

7. The wall support connector assembly of claim 1, wherein:

the first shape of the roller wheel track profile is substantially convex or U-shaped; and the second shape of the channel is substantially concave or U-shaped.

8. The wall support connector assembly of claim 1, further including a pair of soft-close dampers, one on either end of the door rail assembly and abutting one of the two rail stops, each of the soft-close dampers affixed to the door rail assembly at a door rail mounting guide to provide a breaking affect to the horizontal motion of the rolling door.

9. The wall support connector assembly of claim 8, further including a pair of damper triggers affixed to a front side of the vertical adjustment plate to engage at least one of the soft-close dampers, the damper triggers in alignment in both vertical x-axis and depth y-axis and not offset.

10. The wall support connector assembly of claim 1, wherein the vertical adjustment rod extends and retracts to raise or lower the vertical adjustment plate by as much as 10 mm.

11. A wall support connector assembly for mounting a rolling door to a wall, the rolling door including a plurality of wheels mounted on the bottom edge thereof, a top back door face, a first vertical edge, and a second vertical edge, the wall support connector assembly comprising:

a door rail assembly comprising:

a door rail configured to be secured to the top back door face of the rolling door and located between the first vertical edge to the opposing second vertical edge of the door and parallel to the top back door face of the rolling door, the door rail including a door rail top extension defining a roller wheel track profile; and a pair of rail stops each rail stop located at a respective end of the door rail and affixed to the door rail; and a wall mount assembly concurrently engaging the door rail assembly and the wall, the wall mount assembly comprising:

a wall mounting plate configured to be affixed to the wall and defining a wall mounting plate front side including a plurality of bottom flanges, a first side flange, a second side flange, a top flange, and a vertical adjustment knob flange, the vertical adjustment knob flange including a threaded tapped-through hole;

a vertical adjustment plate adjustably affixed to the wall mounting plate between the top flange, the first side flange, and the second side flange;

a vertical adjustment rod mechanically engaging the threaded tapped-through hole of the wall mounting plate, the vertical adjustment rod extending and retracting to raise and lower the vertical adjustment plate and being mounted over the bottom flanges and between the first side flange and the second side flange of the wall mounting plate;

a vertical adjustment knob mounted to the vertical adjustment rod to be rotated clockwise or counterclockwise direction to extend and retract the vertical adjustment rod, the vertical adjustment extending through the vertical adjustment knob flange of the wall mounting plate front side;

a pair of rail guide wheels mounted to the vertical adjustment plate, each rail guide wheel defining a substantially concave or U-shaped channel on the rim thereof, the U-shaped channel approximately matching a corresponding substantially convex or U-shaped roller wheel track profile disposed on the door rail top extension of the door rail of the door rail assembly; and a pair of anti-jump arms attached to the vertical adjustment plate, each anti-jump arms positioned over a rail guide wheel to inhibit the rolling door and door rail assembly from disengaging the wall mount assembly during horizontal movement of the rolling door.

12. The wall support connector assembly of claim 11, wherein the door rail is configured to be secured to the top back door face of the rolling door by including a plurality of holes in a plate thereof through which fasteners may engage the top back door face.

13. The wall support connector assembly of claim 11, wherein the wall mounting plate is configured to be affixed to the wall by including a plurality of holes through which fasteners may engage the wall.

14. The wall support connector assembly of claim 11, wherein the door rail includes a door rail body, the door rail top extension, and a door rail bottom extension, and the door rail top extension and the door rail bottom extension extending at approximately a 90° angle from the door rail body.

15. The wall support connector assembly of claim 11, wherein the pair of rail stops:

define the horizontal range of motion for the rolling door;

define the location to which the rolling door opens or closes; and prevents the rolling door from rolling off the wall mount assembly when the rolling door is in use.

16. The wall support connector assembly of claim 11, wherein the respective horizontal position of each of the rail stops along the door rail is adjustable to define the position to which the rolling door opens or closes.

17. The wall support connector assembly of claim 11, wherein each rail stop includes a Vertical Extension, a first stop flange, a second stop flange, and a door rail mounting guide slide.

18. The wall support connector assembly of claim 11, wherein the rail stops directly contact the rail guide wheel of the wall mount assembly to stop horizontal motion of the rolling door.

19. The wall support connector assembly of claim 18, wherein the respective horizontal position of each of the rail stops along the door rail is adjustable to define the position to which the rolling door opens or closes.

20. The wall support connector assembly of claim 11, wherein:

the door rail includes a door rail top extension, a door rail body, and a door rail bottom extension; and the door rail top extension, door rail body, and door rail bottom extension define a substantially C-shape for the door rail.

21. The wall support connector assembly of claim 11, wherein the door rail assembly, the wall mount assembly, or both are constructed of a metal, a metal alloy, a polymer, or some combination thereof.

22. The wall support connector assembly of claim 11, wherein the rail stops prevent the rolling door from rolling off the wall mount assembly when the rolling door is in use.

23. The wall support connector assembly of claim 11, further including a pair of soft-close dampers, one on either end of the door rail assembly and abutting one of the two rail stops, each of the soft-close dampers affixed to the door rail assembly at a door rail mounting guide to provide a breaking affect to the horizontal motion of the rolling door.

24. The wall support connector assembly of claim 23, further comprising a pair of damper triggers affixed to a front side of the vertical adjustment plate to engage at least one of the soft-close dampers, the damper triggers in alignment in both vertical x-axis and depth y-axis and not offset.

25. The wall support connector assembly of claim 11, wherein the vertical adjustment rod extends and retracts to raise or lower the vertical adjustment plate by as much as 10 mm.

26. A wall support connector assembly for mounting a rolling door to a wall, the rolling door having a left vertical edge, a right vertical edge, a bottom edge, a plurality of wheels mounted on the bottom edge, the wall support connector assembly comprising:

a door rail assembly comprising:

a substantially C shaped metal door rail secured to the top back door face of the rolling door and located between the left vertical edge of the door to the opposing right vertical edge of the rolling door and parallel to the top back door face by affixing fasteners through a plurality of holes in the door rail, the door rail having a door rail top extension, a door rail body, and a door rail bottom extension defining the C shape of the door rail, the door rail top extension and the door rail bottom extension extending from the door rail body at approximately a 90° angle, the door rail top extension defining a roller wheel track profile; and a pair of rail stops to stop horizontal motion of the door and to keep the door affixed to the wall, each rail stop located at a respective end of the door rail and affixed to the door rail, each rail stop including a vertical extension, and a first stop flange, a second stop flange, and a door rail mounting guide slide; and a wall mount assembly concurrently engaging the door rail assembly and the wall, the wall mount assembly comprising:

a wall mounting plate affixed to the wall and defining a wall mounting plate front side and a wall mounting plate back side, the wall mounting plate front side including a plurality of bottom flanges, a first side flange, a second side flange, a top flange, and a vertical adjustment knob flange, the vertical adjustment knob flange including a threaded tapped-through hole;

a vertical adjustment plate adjustably affixed to the wall mounting plate between the top flange, the first side flange, and the second side flange;

a vertical adjustment rod mechanically engaging the threaded tapped-through hole of the wall mounting plate, the vertical adjustment rod extending and retracting to raise and lower the vertical adjustment plate and being mounted over the bottom flanges and between the first side flange and the second side flange of the wall mounting plate;

a vertical adjustment knob mounted to the vertical adjustment rod to be rotated clockwise or counter-clockwise direction to extend and retract the vertical adjustment rod, the vertical adjustment knob extending through the vertical adjustment knob flange of the wall mounting plate front side;

a pair of rail guide wheels mounted to the vertical adjustment plate, each rail guide wheel defining a substantially concave or U-shaped channel on the rim thereof, the U-shaped channel approximately matching a corresponding substantially convex or U-shaped roller wheel track profile disposed on the door rail top extension of the door rail of the door rail assembly; and a pair of anti-jump arms attached to the vertical adjustment plate, each anti-jump arms positioned over a rail guide wheel to inhibit the rolling door and door rail assembly from disengaging the wall mount assembly during horizontal movement of the rolling door.

27. The wall support connector assembly of claim 26, wherein the rail stops prevent the rolling door from rolling off the wall mount assembly when the rolling door is in use.

28. The wall support connector assembly of claim 26, wherein the respective horizontal position of each of the rail stops along the door rail body is adjustable to define the position to which the rolling door opens or closes.

29. The wall support connector assembly of claim 26, further including a pair of soft-close dampers, one on either end of the door rail assembly and abutting one of the two rail stops, each of the soft-close dampers affixed to the door rail assembly at a door rail mounting guide to provide a breaking affect to the horizontal motion of the rolling door.

30. The wall support connector assembly of claim 29, further comprising a pair of damper triggers affixed to a front side of the vertical adjustment plate to engage at least one of the soft-close dampers, the damper triggers in alignment in both vertical x-axis and depth y-axis and not offset from one another.

31. The wall support connector assembly of claim 26, wherein the vertical adjustment rod extends and retracts to raise or lower the vertical adjustment plate by as much as 10 mm.

* * * * *